A. P. SMITH.
AIR-SPRINGS FOR CARS.

No. 183,074.  Patented Oct. 10, 1876.

UNITED STATES PATENT OFFICE.

ANTHONY P. SMITH, OF NEWARK, NEW JERSEY, ASSIGNOR TO HIMSELF AND PATRICK DOYLE, OF SAME PLACE.

IMPROVEMENT IN AIR-SPRINGS FOR CARS.

Specification forming part of Letters Patent No. 183,074, dated October 10, 1876; application filed March 13, 1876.

*To all whom it may concern:*

Be it known that I, ANTHONY P. SMITH, of Newark, in the county of Essex and State of New Jersey, have invented a new and Improved Air-Spring, of which the following is a specification:

The invention consists of that part of the spring which rests on the air contrived as a follower to the packing employed to prevent the escape of the air, in combination with elastic packing, which is thereby expanded against the cylinder more or less, according to the variations of the load and the pressure of the air, so that the friction and the wear vary according to the work, the same being the least when the load is least, and increasing as the load increases, thereby making the air-spring more sensitive, economical, and durable than when so contrived that the pressure against the cylinder is always maintained at the maximum.

Figure 1:
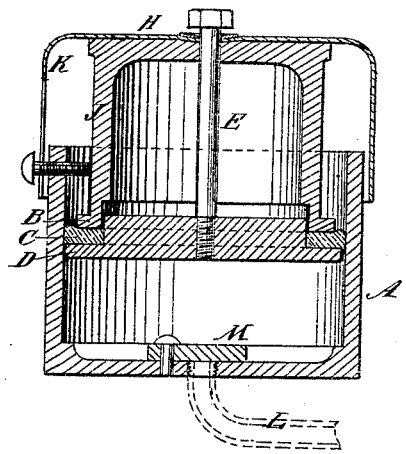
Figure 2:
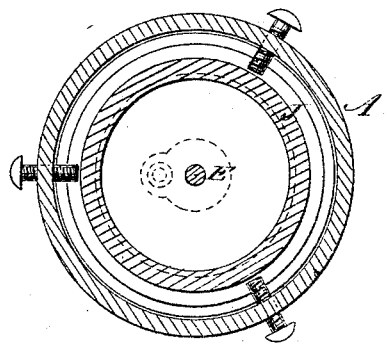

Figure 1 is a longitudinal sectional elevation of my improved spring, and Fig. 2 is a horizontal section.

Similar letters of reference indicate corresponding parts.

A is the cylinder; B, the piston; C, the elastic packing, and D the follower for securing the packing. The follower is screwed up against the packing by the bolt E going down from the top, expanding the packing with only sufficient pressure to make the joint tight with the minimum pressure of the air, after which the further expansion of the packing will be effected by pressure of the air, the expansion increasing in due measure as the pressure of the air increases, and the expansion is needed.

In practice the head of the bolt will be arranged in a depressed socket in the top H of the piston on which the load rests, and said top will be constructed either in a close solid plate or with openings, by which the metal will be economized as the cylindrical part J of the piston will sustain the load.

K is a dust-cap that may be employed to keep the dust out of the cylinder A. L is a pipe, through which to pump in the air to begin with, and from time to time, as may be needed, to replenish it, and M is a valve to close and retain the air. The pipe L will be detachably connected to the cylinder for being taken off when the requisite quantity of air is obtained.

Having thus described my invention, I claim as new and desire to secure by Letters Patent—

The follower D and adjusting-bolt E combined with the elastic packing C, piston B, and the cylinder A, substantially as specified.

ANTHONY P. SMITH.

Witnesses:
T. B. MOSHER,
ALEX. F. ROBERTS.